United States Patent
Fu

(10) Patent No.: US 12,414,081 B2
(45) Date of Patent: Sep. 9, 2025

(54) METHOD FOR DETERMINING RESOURCE LOCATION, COMMUNICATION DEVICE, AND NON-TRANSITORY COMPUTER-READABLE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/014,152

(22) PCT Filed: Aug. 4, 2020

(86) PCT No.: PCT/CN2020/106919
§ 371 (c)(1),
(2) Date: Dec. 31, 2022

(87) PCT Pub. No.: WO2022/027259
PCT Pub. Date: Feb. 10, 2022

(65) Prior Publication Data
US 2023/0262652 A1    Aug. 17, 2023

(51) Int. Cl.
*H04W 68/02* (2009.01)
*H04L 5/00* (2006.01)

(52) U.S. Cl.
CPC ........... *H04W 68/02* (2013.01); *H04L 5/0051* (2013.01)

(58) Field of Classification Search
CPC ..... H04W 68/02; H04W 68/00; H04W 72/04; H04W 72/12; H04W 72/23; H04W 72/53; H04W 52/02; H04W 56/00; H04W 76/28; H04L 5/00; H04L 1/18; H04L 25/02; H04L 27/26; H04L 67/14
USPC ........................................................ 370/329
See application file for complete search history.

(56) References Cited

U.S. PATENT DOCUMENTS

| | | | |
|---|---|---|---|
| 10,420,060 B2 * | 9/2019 | Yoon | H04W 64/003 |
| 11,323,221 B2 * | 5/2022 | Chen | H04L 25/0224 |
| 11,516,770 B2 * | 11/2022 | Radulescu | H04W 72/23 |
| 11,516,772 B2 * | 11/2022 | Chen | H04L 5/0053 |
| 11,729,637 B2 * | 8/2023 | Hsieh | H04W 76/15 370/329 |
| 12,004,120 B2 * | 6/2024 | Radulescu | H04W 68/02 |
| 12,133,249 B2 * | 10/2024 | Sun | H04W 24/10 |
| 12,185,277 B2 * | 12/2024 | Wu | H04W 4/20 |

(Continued)

FOREIGN PATENT DOCUMENTS

| | | |
|---|---|---|
| CN | 108347766 A | 7/2018 |
| CN | 108989003 A | 12/2018 |

(Continued)

OTHER PUBLICATIONS

International Search Report issued in Application No. PCT/CN2020/106919 dated Apr. 23, 2021 with English translation, (4p).

(Continued)

*Primary Examiner* — Man U Phan
(74) *Attorney, Agent, or Firm* — Arch & Lake Law

(57) ABSTRACT

A method for determining a resource location includes: determining a first resource location of a paging occasion; and determining, according to the first resource location, a second resource location of a reference signal for an idle terminal.

18 Claims, 12 Drawing Sheets

(56) References Cited

U.S. PATENT DOCUMENTS

| | | | |
|---|---|---|---|
| 2018/0124644 A1 | 5/2018 | Rico Alvarino et al. | |
| 2019/0104498 A1 | 4/2019 | Jung et al. | |
| 2023/0073100 A1* | 3/2023 | Maleki | H04W 52/0229 |
| 2023/0123822 A1* | 4/2023 | Ohara | H04L 5/0048 |
| | | | 370/350 |
| 2024/0188036 A1* | 6/2024 | Lyu | H04W 68/02 |
| 2024/0340348 A1* | 10/2024 | Lei | H04L 5/0007 |
| 2024/0340793 A1* | 10/2024 | Lei | H04W 68/00 |

FOREIGN PATENT DOCUMENTS

| | | |
|---|---|---|
| CN | 109802792 A | 5/2019 |
| CN | 109842937 A | 6/2019 |
| CN | 110072285 A | 7/2019 |
| CN | 111148221 A | 5/2020 |
| IN | 201937049599 A | 2/2020 |
| WO | 2019139769 A1 | 7/2019 |
| WO | 2020032713 A1 | 2/2020 |
| WO | 2020042373 A1 | 3/2020 |

OTHER PUBLICATIONS

ZTE, "Views on Power Saving Enhancement", 3GPP TSG RAN WG1 #101 e-Meeting R1-2003489, May 16, 2020, (11p).

Notice of Allowance issued in CN Application No. 2020800018456 dated Dec. 15, 2023 with English translation, (6p).

Fang-Chen Cheng CATT: "Study on UE Power Saving in NR," 3GPP TSG RAN, meeting #83, RP-190630, Shenzhen, China, Mar. 18-21, 2018, (30p).

Wang Donghai et al., "UE Cell Location based on Paging Message in LTE," Communications Technology, vol. 52 No. 4, Apr. 10, 2019, (6p).

Aisheng Ye et al., "Research on parameter optimization of LTE user-intensive scenarios," Telecommunications Science, S2, Dec. 20, 2017, (8p).

* cited by examiner

METHOD FOR DETERMINING RESOURCE LOCATION, COMMUNICATION DEVICE, AND NON-TRANSITORY COMPUTER-READABLE MEDIUM

CROSS REFERENCE

The present application is the National Stage of International Application No. PCT/CN2020/106919, filed on Aug. 4, 2020, the entire contents of which are incorporated herein by reference in their entireties for all purposes.

TECHNICAL FIELD

The present disclosure relates to the technical field of communications, and in particular, to a method for determining a resource location and an apparatus, a communication device, and a medium.

BACKGROUND

In the standard discussion of the 5G new air interface (NR, New Radio) R17 phase, a tracking reference signal/channel state information reference signal (TRS/CSI-RS) for an idle terminal is proposed. The access network device may transmit the TRS/CSI-RS to the idle terminal for time-frequency synchronization, radio resource management (RRM), etc.

SUMMARY

According to an aspect of the embodiments of the present disclosure, there is provided a method for determining a resource location, the method includes:
  determining a first resource location of a paging occasion; and determining, according to the first resource location, a second resource location of a reference signal for an idle terminal.

According to an aspect of the present disclosure, there is provided a communication device, including:
  a processor; and
  a memory, configured to store an instruction executable by the processor;
  where the processor is configured to load and execute the executable instruction to implement the method for determining the resource location according to any one of the above.

According to an aspect of the present disclosure, there is provided a non-transitory computer-readable storage medium, when an instruction in the computer-readable storage medium is executed by a processor, the method for determining the resource location according to any one of the above is performed.

BRIEF DESCRIPTION OF THE DRAWINGS

The accompanying drawings here are incorporated in and constitute a part of the description, illustrate embodiments consistent with the present disclosure, and serve to explain the principles of the present disclosure together with the description.

DETAILED DESCRIPTION

Figure 1:
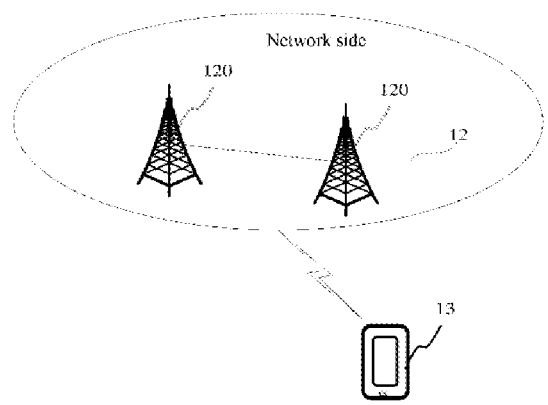
FIG. 1 shows a block diagram of a communication system according to an embodiment of the present disclosure.

Embodiments will be described in detail here, examples of which are illustrated in the accompanying drawings. The following description refers to the accompanying drawings in which the same numbers in different drawings represent the same or similar elements unless otherwise represented. The embodiments described in the following embodiments do not represent all implementations consistent with the present disclosure. Rather, they are examples of apparatuses and methods consistent with some aspects of the present disclosure as detailed in the appended claims.

The term used in the embodiments of the present disclosure is for the purpose of describing particular embodiments and is not intended to limit the embodiments of the present disclosure. As used in the embodiments of the present disclosure and the appended claims, the singular forms "a" and "the" are also intended to include most forms unless the context clearly indicates other meanings. It should also be understood that the term "and/or" as used here refers to and includes any or all possible combinations of one or more associated listed items.

It should be understood that although the terms first, second, third, etc. may be used in the embodiments of the present disclosure to describe various information, the information should not be limited to these terms. These terms are used to distinguish the same type of information from each other. For example, without departing from the scope of the embodiments of the present disclosure, the first information may also be referred to as second information, and similarly, the second information may also be referred to as first information. Depending on the context, the words "if" and "in case that" as used here may be interpreted as "on time that" or "when" or "in response to determining".

It should be understood that although the steps have been described in the manner of facilitating understanding in the embodiments of the present disclosure, these numbers do not represent the order of execution of the steps, and do not represent that the steps with sequential numbers must be executed together. It should be understood that one or more of the plurality of steps of sequential numbering may be performed separately to solve the corresponding technical problem and achieve a predetermined technical solution. Even if a plurality of step is listed together as examples in the drawings, and it does not represent these steps to be performed together, these steps are listed together as examples in the drawings in order to facilitate understanding.

In the related art, for a radio resource control (Radio Resource Control, RRC) connected terminal, the access network device notifies the terminal of the resource location for the TRS/CSI-RS through a terminal dedicated signaling, and for an idle terminal, since there is no RRC connection between the idle terminal and the access network device, the resource location for the TRS/CSI-RS cannot be transmitted to the terminal through the terminal dedicated signaling, thus affecting the normal reception of the TRS/CSI-RS by the terminal.

FIG. 1 shows a block diagram of a communication system according to an embodiment of the present disclosure. As shown in FIG. 1, the communication system may include a network side 12 and a terminal 13.

The network side 12 includes several access network devices 120. The access network device 120 may be a base station, and the base station is a device deployed in an access network to provide a wireless communication function for the terminal. The base station may be a base station of a serving cell of the terminal 13, or may be a base station of a neighboring cell of the serving cell of the terminal 13. The base station may include various forms of macro base stations, micro base stations, relay stations, access points, transmission reception points (Transmission Reception Point, TRPs), and the like. In a system using different radio access technologies, the name of a device with a base station function may be different, and in a 5G NR system, it is referred to as a gNodeB or a gNB. With the evolution of the communication technology, the described name of the "base station" may change. The access network device 120 may also be a location management function (Location Management Function, LMF) entity.

The terminal 13 may include various handheld devices, vehicle-mounted devices, wearable devices, computing devices with wireless communication function, or other processing devices connected to the wireless modem, and various forms of user equipment, mobile stations (MS), terminals, Internet of Things (IoT) equipment, industrial Internet of Things (IIoT) equipment, and the like. For ease of description, the devices mentioned above are collectively referred to as terminals. The access network device 120 and the terminal 13 communicate with each other through a certain air interface technology, for example, a Uu interface.

In the standard discussion of the 5G NR R 17 phase, a solution for a TRS/CSI-RS for an idle terminal is proposed. In addition to time-frequency synchronization and radio resource management measurement, the TRS/CSI-RS may also be placed before a PO (Paging Occasion) and used as a WUS (Wake Up Signal) signal. That is, if the terminal detects the TRS/CSI-RS before the PO, it indicates that there is a short message (short message) or a paging message (paging message) in the PO, and then the terminal needs to continue to monitor the PO to obtain the short message or the paging message. If the terminal does not detect the TRS/CSI-RS before the PO, it indicates that there is no short message or paging message in the PO, and then the terminal does not need to monitor the PO. Among them, the TRS includes a plurality of periodically transmitted non-zero power (NZP) CSI-RS.

The communication system and the service scenario described in the embodiments of the present disclosure are intended to illustrate the technical solutions of the embodiments of the present disclosure more clearly, and do not constitute a limitation on the technical solutions provided in the embodiments of the present disclosure. Those of ordinary skill in the art may know that, with the evolution of a communication system and the occurrence of a new service scenario, the technical solutions provided in the embodiments of the present disclosure are also applicable to similar technical problems.

Figure 2:
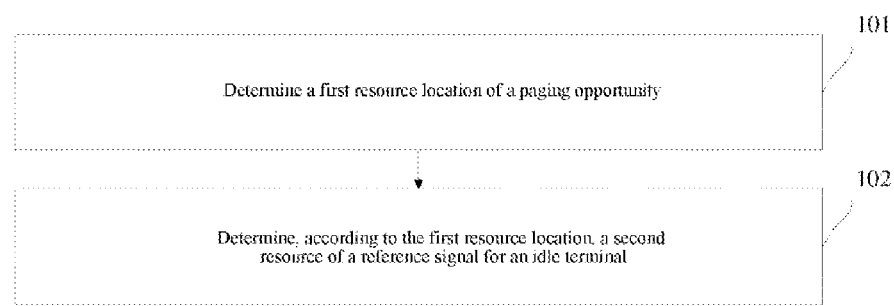
FIG. 2 is a flowchart of a method for determining a resource location according to an embodiment.

FIG. 2 is a flowchart of a method for determining a resource location according to an embodiment. The method may be performed by a communication device, and the communication device may be an access network device or a terminal. Referring to FIG. 2, the method includes the following steps.

In step 101, a first resource location of a paging occasion is determined.

In step 102, a second resource location of a reference signal for an idle terminal is determined according to the first resource location.

In embodiments of the present disclosure, the second resource location of the reference signal for the idle terminal is determined according to the first resource location of the PO, so that the second resource location of the reference signal of the idle terminal is notified without through dedicated signaling.

In some embodiments of the present disclosure, the resource location is a time domain location and/or a frequency domain location. The time domain location is, for example, a symbol; and the frequency domain location is, for example, a frequency domain location of a resource block.

In some embodiments, both the first resource location and the second resource location include symbols.

The determining the second resource location of the reference signal for the idle terminal according to the first resource location includes: determining symbols for the reference signal according to symbols occupied by the paging occasion.

In some embodiments, the determining the symbols for the reference signal according to the symbols occupied by the paging occasion includes: determining an end symbol in the symbols for the reference signal according to a start symbol in the symbols occupied by the paging occasion and a first offset value, where the symbols for the reference signal are before the symbols occupied by the paging occasion.

In some embodiments, the first offset value is appointed by a protocol, or is configured by a system message.

In some embodiments, the determining the symbols for the reference signal according to the symbols occupied by the paging occasion includes: determining a start symbol in the symbols for the reference signal according to an end symbol in the symbols occupied by the paging occasion and a second offset value, where the symbols for the reference signal are after the symbols occupied by the paging occasion.

In some embodiments, the second offset value is appointed by a protocol, or is configured by a system message.

In some embodiments, the determining the symbols for the reference signal according to the symbols occupied by the paging occasion includes: determining a symbol range to which the symbols for the reference signal belongs according to a number of continuous symbol, a number of interval symbol and a starting symbol in the symbols occupied by the paging occasion, where the number of the continuous symbols is the number of symbols contained in the symbol range, the number of the interval symbol is the number of symbol between the starting symbol and the symbol range, and the symbol range is before the symbols occupied by the paging occasion.

In some embodiments, the number of the continuous symbols and the number of the interval symbol are appointed by a protocol, or configured by a system message.

In some embodiments, the symbols for the reference signal is configured for transmission of the reference signal at least one time. In some embodiments, the reference signal is transmitted once on the symbols for the reference signal. In other embodiments, the reference signal is repeatedly transmitted more than one time on the symbols for the reference signal.

In some embodiments, the number of the transmission of the reference signal on the symbols for the reference signal is appointed by a protocol, or is configured by a system message.

In some embodiments, both the first resource location and the second resource location include a frequency domain location of a resource block.

The determining the second resource location of the reference signal for the idle terminal according to the first resource location includes: determining a frequency domain location of a resource block for the reference signal according to a frequency domain location of a resource block occupied by the paging occasion.

In some embodiments, the frequency domain location of the resource block occupied by the paging occasion is a frequency domain location of a resource block occupied by a control resource set corresponding to the paging occasion.

In some embodiments, the determining the frequency domain location of the resource block for the reference signal according to the frequency domain location of the resource block occupied by the paging occasion includes:
determining the frequency domain location of the resource block occupied by the paging occasion as the frequency domain location of the resource block for the reference signal.

In some embodiments, the determining the frequency domain location of the resource block for the reference signal according to the frequency domain location of the resource block occupied by the paging occasion includes:
determining a combination of a first frequency domain location of a first resource block occupied by the paging occasion and a second frequency domain location of a second resource block on the two sides of the first resource block as the frequency domain location of the resource block for the reference signal.

In some embodiments, the number of the second resource block on the two sides of the first resource block is equal, or the number of the second resource block on the two sides of the first resource block is different.

In some embodiments, the frequency domain location of the resource block for the reference signal is located in a frequency band corresponding to the initial bandwidth part.

In some embodiments, the reference signal is a TRS or a CSI-RS.

In some embodiments, the first resource location is before the second resource location in time domain, and the method further includes: detecting a reference signal at the second resource location, where the reference signal is configured for indicating whether the terminal needs to monitor the paging occasion; or, transmitting a reference signal at the second resource location, where the reference signal is configured for indicating whether the terminal needs to monitor the paging occasion.

It should be noted that the above-mentioned steps 101 to step 102 and the optional steps described above may be combined arbitrarily.

Figure 3:
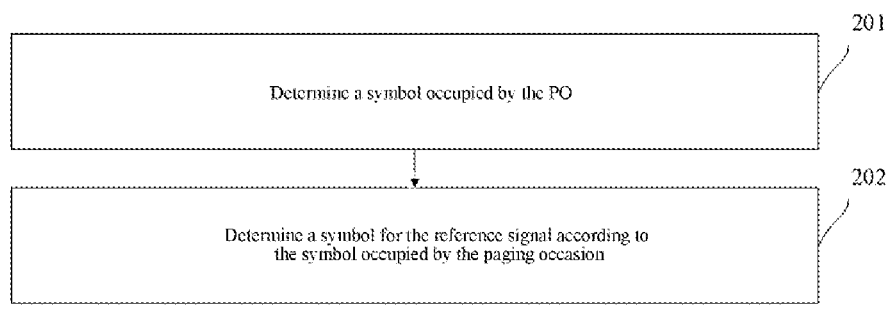
FIG. 3 is a flowchart of a method for determining a resource location according to an embodiment.

FIG. 3 is a flowchart of a method for determining a resource location according to an embodiment. The method may be performed by a communication device, and the communication device may be the above-mentioned access network device or terminal. In the embodiment shown in FIG. 3, the resource is a time domain resource, and both the first resource location and the second resource location include symbols. Referring to FIG. 3, the method includes the following steps:

In step 201, symbols occupied by the PO are determined.

For example, the symbol occupied by the PO may be determined according to the paging search space configuration in the SIB1 (System Information Block 1).

The first resource location occupied by the PO may be determined by the step 201.

In step 202, symbols for the reference signal is determined according to the symbols occupied by the paging occasion.

The second resource location for the reference signal may be determined according to the first resource location by the step 202.

In a possible embodiment, the step 202 includes: determining an end symbol in the symbols for the reference signal according to a start symbol in the symbols occupied by the paging occasion and a first offset value, where the symbols for the reference signal are before the symbols occupied by the paging occasion.

For example, the symbol that is before the start symbol in the symbol occupied by PO and is spaced by X symbols from the start symbol is determined as the end symbol in the symbols for the reference signal. Here, X is equal to the first offset value.

Figure 4:
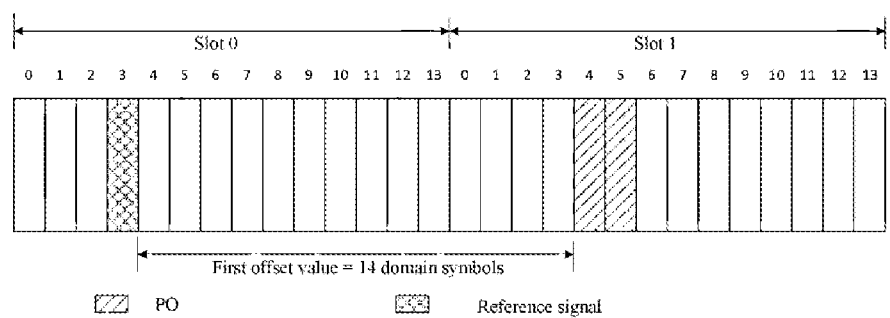
FIG. 4 is a schematic diagram of a relationship between a resource location of a PO and a resource location of a reference signal according to an embodiment.

For example, as shown in FIG. 4, one slot includes 14 symbols, the symbols occupied by the PO are the symbol 4 and the symbol 5 in the slot 1, that is, the starting symbol in the symbols occupied by the PO is the symbol 4 in the slot 1. The first offset value is equal to 14, the symbol 3 in the slot 0 is before the symbol 4 in the slot 1 and is spaced by 14 symbols from the symbol 4 in the slot 1, and the symbol 3 in the slot 0 is the end symbol in the symbols for the reference signal.

For example, symbols used for the reference signal may be determined according to the number of the symbol (that is, time domain length) used for the reference signal and the location of the end symbol. For example, in FIG. 4, the reference signal occupies one symbol in the time domain, and the symbol used for the reference signal is the symbol 3 in the slot 0.

In some embodiments, the first offset value is appointed by a protocol or configured by a system message (that is, configured by an access network device). In some embodiments, the number of the symbol used for the reference signal is appointed by a protocol or configured by a system message (that is, configured by an access network device).

In this manner, the reference signal may be used for time-frequency tracking, WUS indication, and channel estimation during PDCCH (Physical Downlink Control Channel)/PDSCH (Physical Downlink Shared Channel) demodulation.

In some embodiments, the step 202 includes: determining a start symbol in the symbols for the reference signal according to an end symbol in the symbols occupied by the paging occasion and a second offset value, where the symbols for the reference signal are after the symbols occupied by the paging occasion.

For example, the symbol that are after the start symbol in the symbol occupied by the PO and is spaced by Y symbols from the end symbol is used as the start symbol in the symbols for the reference signal, here, Y is equal to the second offset value.

Figure 5:
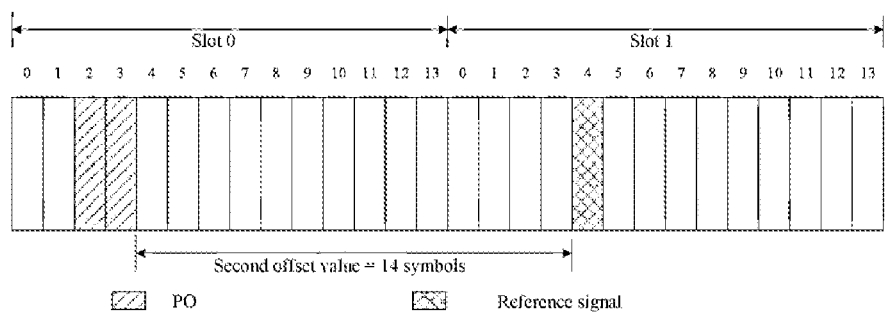
FIG. 5 is a schematic diagram of a relationship between a resource location of a PO and a resource location of a reference signal according to an embodiment.

For example, as shown in FIG. 5, one slot includes 14 symbols, symbols occupied by the PO are the symbol 2 and the symbol 3 in the slot 0, that is, the end symbol in the symbol occupied by the PO is the symbol 3 in the slot 0. The second offset value is equal to 14, the symbol 4 in the slot 1 are after the symbol 3 in the slot 0 and is spaced by 14 symbols from the symbol 3 in the slot 0, and the symbol 4 in the slot 1 is the starting symbol in the symbol used for the reference signal.

For example, symbols used for the reference signal may be determined according to the number of the symbol (that is, time domain length) used for the reference signal and the location of the start symbol. For example, in FIG. 5, the reference signal occupies one symbol in the time domain, and the symbol used for the reference signal is the symbol 4 in the slot 1.

In some embodiments, the second offset value is appointed by a protocol or configured by a system message (that is, configured by an access network device). In some embodiments, the number of the symbol used for the reference signal is appointed by a protocol or configured by a system message (that is, configured by an access network device).

In this manner, the reference signal may be used for channel estimation during PDCCH/PDSCH demodulation.

In some embodiments, the step 202 includes: determining a symbol range to which the symbols for the reference signal belongs according to a number of continuous symbol, a number of interval symbol, and a starting symbol in symbols occupied by the paging occasion, where the number of the continuous symbols is the number of the symbol included in the symbol range, the number of the interval symbol is the number of the symbol between the starting symbol and the symbol range, and the symbol range is before the symbols occupied by the paging occasion. That is, the number of the symbol between the end symbol of the symbol range and the starting symbol in the symbol occupied by the PO is the number of the interval symbol.

Figure 6:
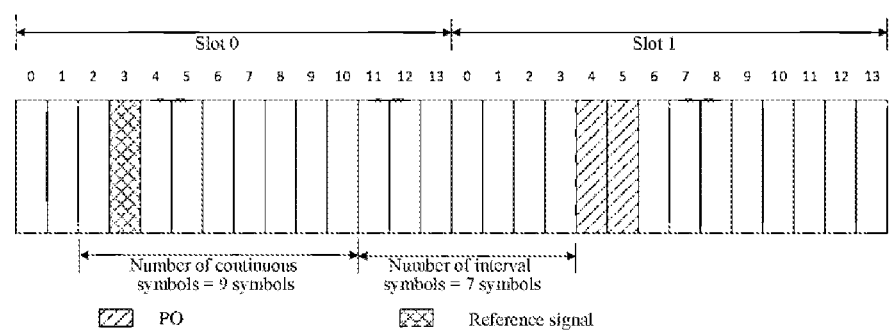
FIG. 6 is a schematic diagram of a relationship between a resource location of a PO and a resource location of a reference signal according to an embodiment.

For example, as shown in FIG. 6, one slot includes 14 symbols, symbols occupied by the PO are the symbol 4 and the symbol 5 in the slot 1, that is, the starting symbol in the symbols occupied by the PO is the symbol 4 in the slot 1.

The first offset value is equal to 14, and the symbol 3 in the slot 0 is before the symbol 4 in the slot 1 and is separate by 14 symbols from the symbol 4 in the slot 1, and the symbol 3 in the slot 0 is the end symbol in the symbols for the reference signal. If the number of the continuous symbols is 9 and the number of the interval symbols is 7, it can be determined that the symbol range to which the symbols for the reference signal belongs is the symbol 2 to the symbol 10 in the time slot 0. That is, the symbol used for the reference signal is part symbols of the symbol 2 to the symbol 10 in the slot 0, such as, the symbol 3 in the slot 0 in FIG. 6

In some embodiments, the number of the interval symbol is appointed by a protocol or configured by a system message (that is, configured by an access network device). In some embodiments, the number of continuous symbols is appointed by a protocol or configured by a system message.

In some embodiments, the number of the symbol used for the reference signal is appointed by a protocol or configured by a system message (that is, configured by an access network device).

Since the symbol range to which the symbols for the reference signal belongs is defined in this manner, the access network device may have certain flexibility to adjust the time domain location of the reference signal, so that the reference signal does not conflict with other downlink data other than the reference signal, and does not conflict with the semi-static configuration uplink time domain resource.

In this manner, the reference signal may be used for time-frequency tracking, WUS indication, and channel estimation during PDCCH PDSCH demodulation.

In the embodiments of the present disclosure, the symbols for the reference signal is used for transmission of the reference signal at least one time.

In some embodiments, in the embodiment corresponding to FIG. 4 and FIG. 6, the symbols for the reference signal is used for transmission of the reference signal for a single time.

Alternatively, in other embodiments, the symbol used for the reference signal is used for repeatedly transmission of the reference signal for more than one time, that is, the reference signal is repeatedly transmitted multiple times in the time domain, so that the terminal accurately performs time-frequency synchronization.

Figure 7:
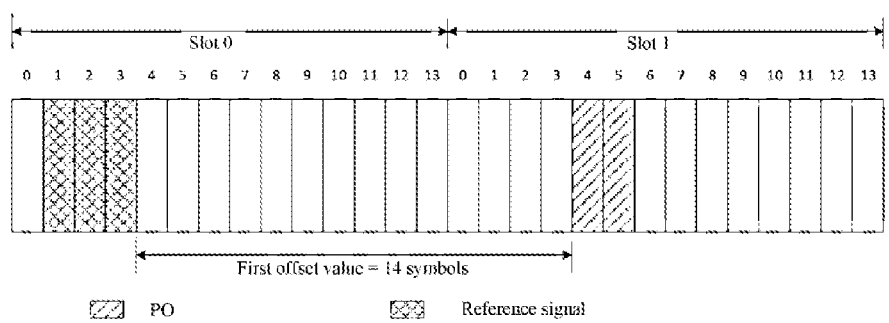
FIG. 7 is a schematic diagram of a relationship between a resource location of a PO and a resource location of a reference signal according to an embodiment.
Figure 8:
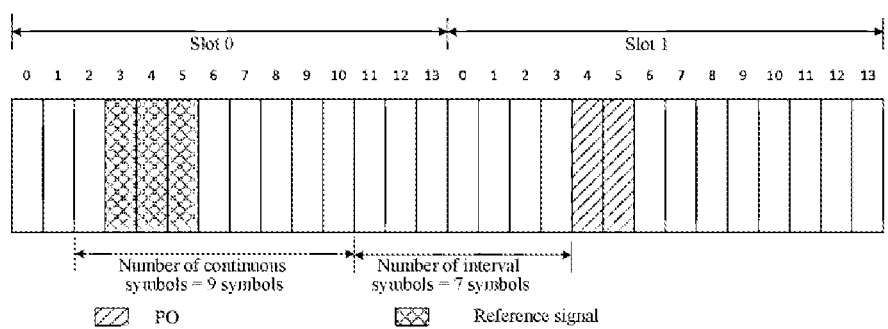
FIG. 8 is a schematic diagram of a relationship between a resource location of a PO and a resource location of a reference signal according to an embodiment.

For example, as shown in FIG. 7, symbols for the reference signal are the symbol 1 to the symbol 3 in a slot 0, and the reference signal is transmitted three times repeatedly. For another example, as shown in FIG. 8, the symbols used for the reference signal are the symbol 3 to the symbol 5 in the slot 0, and the reference signal is transmitted three times repeatedly.

In some embodiments, the number of the repeated transmission is appointed by a protocol, or configured by a system message.

Figure 9:
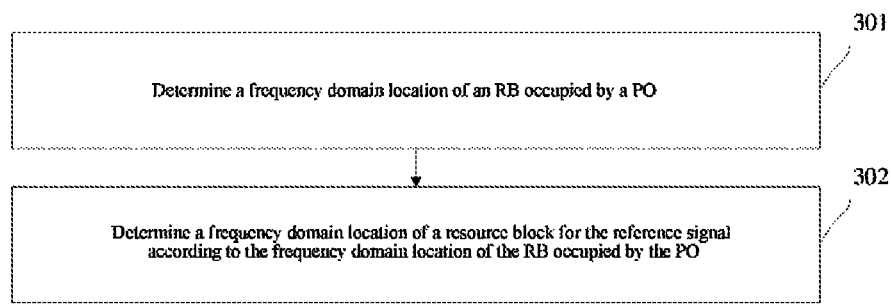
FIG. 9 is a flowchart of a method for determining a resource location according to an embodiment.

FIG. 9 is a flowchart of a method for determining a resource location according to an embodiment. The method may be performed by a communication device, and the communication device may be the foregoing access network device or terminal. In the embodiment shown in FIG. 9, the resource is a frequency domain resource, and both the first resource location and the second resource location include the frequency domain location of the resource block (RB). Referring to FIG. 9, the method includes the following steps.

In step 301, a frequency domain location of an RB occupied by a PO is determined.

In the embodiment of the present disclosure, one RB corresponds to one slot and 12 subcarriers. The frequency domain location of the RB is the subcarrier corresponding to the RB.

The frequency domain location of the RB occupied by the PO is the frequency domain location of the resource block occupied by the control resource set (COntrol REsource SET, CORESET) corresponding to the PO.

For example, the frequency domain location of the RB occupied by the PO may be determined according to the paging search space configuration in the SIB1.

The first resource location occupied by the PO may be determined by the step 301.

In step 302, a frequency domain location of a resource block for the reference signal is determined according to the frequency domain location of the RB occupied by the PO.

The second resource location for the reference signal may be determined according to the first resource location by the step 302.

In some embodiments, the step 302 includes: determining the frequency domain location of the RB occupied by the PO as the frequency domain location of the PB for the reference signal. That is, the frequency domain location of the PB for the reference signal is the same as the frequency domain location of the RB occupied by the PO.

For example, the CORESET corresponding to the PO is CORESET 0, the occupied RB is RB 12 to RB 59 (total 48 RBs), and correspondingly, the PB for the reference signal is RB 12 to RB 59.

In some embodiments, the step 302 includes: determining a combination of a first frequency domain location of a first RB occupied by the PO and a second frequency domain location of a second RB on two sides of the first resource block as a frequency domain location of the RB for the reference signal. In this embodiment, the frequency domain resource location of the reference signal is similar to the frequency domain resource location where the PO is located.

In some embodiments, the number of the second resource block on the two sides of the first resource block is equal. For example, the number of the second resource block may be a fixed value, for example, may be appointed by a protocol, or may be configured by a system message. In some embodiments, the number of the second resource block on one side of the first resource block may be appointed or configured, or the sum of the numbers of second resource blocks on the two sides of the first resource block may be appointed or configured.

For example, the frequency domain location of the RB occupied by the PO is RB 18 to RB 41 (total 24 RBs), the RB occupied by the reference signal includes RB 18 to RB 41, and with RB18 to RB41 as the center, the total number of RBs occupied is 48, for example, RB 6 to RB 53 (total 48 RBs). That is, the first resource block is RB 18 to RB 41, and the second resource block is RB 6 to RB 17 and RB 42 to RB 53.

Alternatively, the number of the second resource block on the two sides of the first resource block is different.

In some embodiments, a frequency domain location of the resource block for the reference signal is located in a frequency band corresponding to the initial bandwidth part (initial BWP).

For example, the frequency domain range of the initial BWP is RB 0 to RB 49, and the RB for reference signal cannot exceed RB0 to RB49. It is assumed that the frequency domain location of the RB occupied by the PO is RB 18 to RB 41 (total 24 RBs), the RB occupied by the reference signal includes RB 18 to RB 41, and the total number of RBs occupied is 48, for example, RB 2 to RB 49, that is, the first resource block is RB 18 to RB 41, and the second resource block is RB 2 to RB 17 and RB 42 to RB 49. Alternatively, the RB occupied by the reference signal includes RB 18 to RB 41, and the total number of RBs occupied is 44 (the RB beyond the frequency domain range of the initial bandwidth part is removed), for example, RB 6 to RB 49, that is, the first resource block is RB 18 to RB 41, and the second resource block is RB 6 to RB 17 and RB 42 to RB 49.

When the frequency domain resource location of the reference signal is the same as or similar to the frequency domain resource location where the PO is located, the reference signal may be used to perform channel estimation on the time-frequency channel in the PO. Thus, in the embodiment of the present disclosure, the frequency domain location of the PB for the reference signal is determined according to the frequency domain location of the RB occupied by the PO, so as to ensure the detection performance of the reference signal.

In some embodiments, after determining the second resource location by using the method shown in FIG. 3 and/or FIG. 9, the method further includes that:

the access network device transmits the PO according to the first resource location and transmits the reference signal according to the second resource location;

the terminal detects the reference signal according to the second resource location.

In some embodiments, if the first resource location is before the second resource location in the time domain and the reference signal is used to indicate whether the terminal needs to monitor the paging occasion, and if the terminal detects the reference signal at the second resource location, the PO continues to be monitored at the first resource location corresponding to the second resource location, otherwise, if the terminal does not detect the reference signal at the second resource location, the PO does not need to be monitored at the first resource location corresponding to the second resource location.

Figure 10:
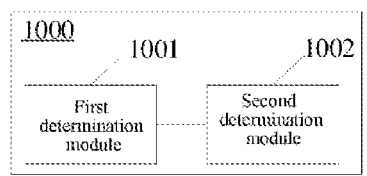
FIG. 10 is a schematic structural diagram of an apparatus for determining a resource location according to an embodiment.

FIG. 10 is a schematic structural diagram of an apparatus for determining a resource location according to an embodiment. The apparatus has a function of implementing the communication device in the foregoing method embodiment, and the function may be implemented by hardware, or may be implemented by hardware executing corresponding software. As shown in FIG. 10, the apparatus 1000 includes a first determination module 1001 and a second determination module 1002.

Among them, the first determination module 1001 is configured to determine a first resource location of a paging occasion; and the second determination module 1002 is configured to determine a second resource location of a reference signal for an idle terminal according to the first resource location.

In some embodiments, both the first resource location and the second resource location include symbols.

The second determination module 1002 is configured to determine symbols for the reference signal according to symbol occupied by the paging occasion.

In some embodiments, the second determination module 1002 is configured to determine an end symbol in symbols for the reference signal according to a start symbol in symbols occupied by the paging occasion and a first offset value, where the symbols for the reference signal are before the symbols occupied by the paging occasion.

In some embodiments, the first offset value is appointed by a protocol, or is configured by a system message.

In some other embodiments, the second determination module 1002 is configured to determine a start symbol in symbols for the reference signal according to an end symbol in symbols occupied by the paging occasion and a second offset value, where the symbols for the reference signal are after the symbols occupied by the paging occasion.

In some embodiments, the second offset value is appointed by a protocol, or is configured by a system message.

In some other embodiments, the second determination module 1002 is configured to determine a symbol range to which symbols for the reference signal belongs according to a number of continuous symbols, a number of an interval symbol, and a starting symbol in symbols occupied by the paging occasion, where the number of the continuous symbols is the number of the symbol included in the symbol range, the number of the interval symbol is the number of the symbol between the starting symbol and the symbol range, and the symbol range is before the symbols occupied by the paging occasion.

In some embodiments, the number of the continuous symbols and the number of the interval symbol are appointed by a protocol, or configured by a system message.

In some embodiments, the symbols for the reference signal is used for transmission of the reference signal at least one time.

In some embodiments, the number of the transmission of the reference signal on the symbols for the reference signal is appointed by a protocol, or is configured by a system message.

In some embodiments, both the first resource location and the second resource location include a frequency domain location of the resource block. The second determination module 1002 is configured to determine a frequency domain location of a resource block for the reference signal according to a frequency domain location of a resource block occupied by the paging occasion.

In some embodiments, the frequency domain location of the resource block occupied by the paging occasion is a frequency domain location of a resource block occupied by a control resource set corresponding to the paging occasion.

In some embodiments, the second determination module 1002 is configured to determine the frequency domain location of the resource block occupied by the paging occasion as the frequency domain location of the resource block for the reference signal.

In some embodiments, the second determination module 1002 is configured to determine a combination of a first frequency domain location of a first resource block occupied by the paging occasion and a second frequency domain location of a second resource block on the two sides of the first resource block as the frequency domain location of the resource block for the reference signal.

In some embodiments, the number of the second resource block on the two sides of the first resource block is equal, or the number of the second resource block on the two sides of the first resource block is different.

In some embodiments, the frequency domain location of the resource block for the reference signal is located in a frequency band corresponding to the initial bandwidth part.

In some embodiments, the reference signal is a TRS or a CSI-RS.

In some embodiments, the first resource location is before the second resource location in time domain, and the apparatus further includes: a detection module configured to detect a reference signal at the second resource location, where the reference signal is used to indicate whether the terminal needs to monitor the paging occasion.

In some embodiments, the first resource location is before the second resource location in time domain, and the apparatus further includes: a sending module configured to transmit a reference signal at the second resource location, where the reference signal is used to indicate whether the terminal needs to monitor the paging occasion.

Embodiments of the present disclosure further provide a communication device, and the communication device includes:
 a processor;
 a memory for storing an instruction executable by the processor;
 where, the processor is configured to load and execute the executable instruction to implement the method for determining the resource location as described above.

In some embodiments, the communication device is a terminal or an access network device.

Figure 11:
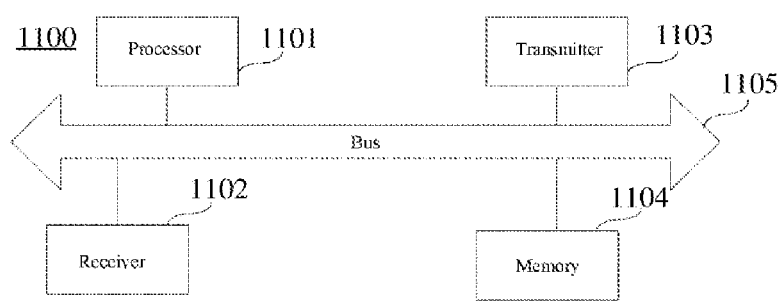
FIG. 11 is a block diagram of a terminal according to an embodiment.

FIG. 11 is a block diagram of a terminal 1100 according to an embodiment, and the terminal 1100 may include a processor 1101, a receiver 1102, a transmitter 1103, a memory 1104, and a bus 1105.

The processor 1101 includes one or more processing cores, and the processor 1101 executes various functional applications and information processing by running a software program and a module.

The receiver 1102 and the transmitter 1103 may be implemented as a communication component, and the communication component may be a communication chip.

The memory 1104 is connected to the processor 1101 through the bus 1105.

The memory 1104 may be configured to store at least one instruction, and the processor 1101 is configured to execute the at least one instruction to implement the method executed by the terminal in the resource location determination method.

In addition, the memory 1104 may be implemented by any type of volatile or non-volatile storage device or a combination of them, including but not limited to: a magnetic or optical disc, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM).

In an embodiment, further provided is a computer-readable storage medium, the computer-readable storage medium storing at least one instruction, at least one program, a code set or an instruction set. The at least one instruction, the at least one program, the code set or the instruction set is loaded and executed by the processor to implement the method for determining the resource location provided by the foregoing method embodiments.

Figure 12:
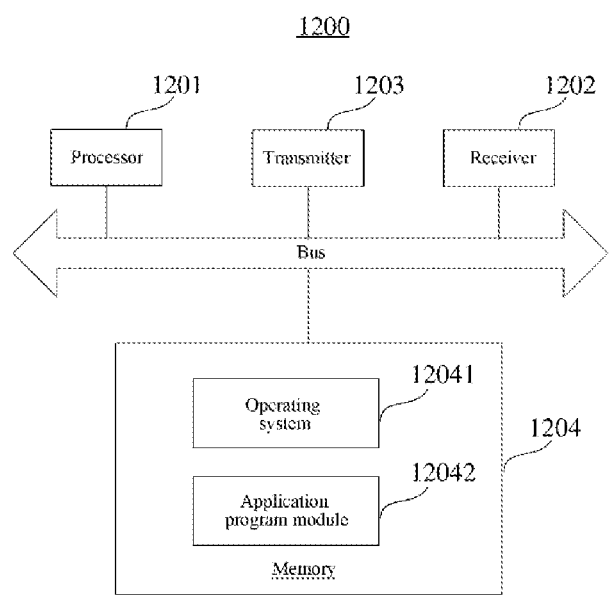
FIG. 12 is a block diagram of an access network device according to an embodiment.

FIG. 12 is a block diagram of an access network device 1200 according to an embodiment. As shown in FIG. 12, an access network device 1200 may include a processor 1201, a receiver 1202, a transmitter 1203, and a memory 1204. The receiver 1202, the transmitter 1203 and the memory 1204 are respectively connected to the processor 1201 by means of a bus.

Among them, the processor 1201 includes one or more processing cores, and the processor 1201 runs a software program and a module to perform the method executed by the access network device in the resource location determination method provided in the embodiments of the present disclosure. The memory 1204 may be configured to store a software program and a module. Specifically, the memory 1204 may store an operating system 12041 and at least one application program module 12042 needed by function. The receiver 1202 is configured to receive communication data sent by other devices. The transmitter 1203 is configured to send communication data to other devices.

In some embodiments, further provided is a computer-readable storage medium, the computer-readable storage medium storing at least one instruction, at least one program, a code set or an instruction set. The at least one instruction, the at least one program, the code set or the instruction set is loaded and executed by the processor to implement the resource location determination method provided by the foregoing method embodiments.

An embodiment of the present disclosure further provides a communication system, the communication system including a terminal and an access network device. The terminal is a terminal provided in the embodiment shown in FIG. 11. The access network device is an access network device provided in the embodiment shown in FIG. 12.

Embodiments of the present disclosure disclose a method for determining a resource location, an apparatus, a communication device, and a medium. The technical solution is as follows:

According to an aspect of the embodiments of the present disclosure, there is provided a method for determining a resource location, the method includes:
   determining a first resource location of a paging occasion; and determining, according to the first resource location, a second resource location of a reference signal for an idle terminal.

In some embodiments, both the first resource location and the second resource location include symbols,
   the determining, according to the first resource location, the second resource location of the reference signal for the idle terminal includes: determining symbols for the reference signal according to symbols occupied by the paging occasion.

In some embodiments, the determining the symbols for the reference signal according to the symbols occupied by the paging occasion includes:
   determining an end symbol in the symbols for the reference signal according to a start symbol in the symbols occupied by the paging occasion and a first offset value, where the symbols for the reference signal are before the symbols occupied by the paging occasion.

In some embodiments, the first offset value is appointed by a protocol, or is configured by a system message.

In some embodiments, the determining the symbols for the reference signal according to the symbols occupied by the paging occasion includes:
   determining a start symbol in the symbols for the reference signal according to an end symbol in the symbols occupied by the paging occasion and a second offset value, where the symbols for the reference signal are after the symbols occupied by the paging occasion.

In some embodiments, the second offset value is appointed by a protocol, or is configured by a system message.

In some embodiments, the determining the symbols for the reference signal according to the symbols occupied by the paging occasion includes:
   determining a symbol range to which the symbols for the reference signal belongs according to a number of continuous symbols, a number of an interval symbol and a starting symbol in the symbols occupied by the paging occasion, where the number of the continuous symbols is a number of symbols contained in the symbol range, the number of the interval symbol is a number of a symbol between the starting symbol and the symbol range, and the symbol range is before the symbols occupied by the paging occasion.

In some embodiments, the number of the continuous symbols and the number of the interval symbol are appointed by a protocol, or configured by a system message.

In some embodiments, the symbols for the reference signal is configured for transmission of the reference signal at least one time.

In some embodiments, a number of a transmission of the reference signal on the symbols for the reference signal is appointed by a protocol, or configured by a system message.

In some embodiments, both the first resource location and the second resource location include a frequency domain location of a resource block;
   the determining, according to the first resource location, the second resource location of the reference signal for the idle terminal includes:
   determining a frequency domain location of a resource block for the reference signal according to a frequency domain location of a resource block occupied by the paging occasion.

In some embodiments, the frequency domain location of the resource block occupied by the paging occasion is a frequency domain location of a resource block occupied by a control resource set corresponding to the paging occasion.

In some embodiments, the determining the frequency domain location of the resource block for the reference signal according to the frequency domain location of the resource block occupied by the paging occasion includes:
   determining the frequency domain location of the resource block occupied by the paging occasion as the frequency domain location of the resource block for the reference signal.

In some embodiments, the determining the frequency domain location of the resource block for the reference signal according to the frequency domain location of the resource block occupied by the paging occasion includes:
   determining a combination of a first frequency domain location of a first resource block occupied by the paging occasion and a second frequency domain location of a second resource block on two sides of the first resource block as the frequency domain location of the resource block for the reference signal.

In some embodiments, a number of the second resource block on the two sides of the first resource block is equal, or the number of the second resource block on the two sides of the first resource block is different.

In some embodiments, the frequency domain location of the resource block for the reference signal is located in a frequency band corresponding to an initial bandwidth part.

In some embodiments, the reference signal is a TRS or a CSI-RS.

In some embodiments, the first resource location is before the second resource location in time domain, and the method further includes:
   detecting a reference signal at the second resource location, where the reference signal is configured for indicating whether the terminal needs to monitor the paging occasion by the terminal; or
   transmitting a reference signal at the second resource location, where the reference signal is configured for indicating whether the terminal needs to monitor the paging occasion.

According to an aspect of the present disclosure, there is provided an apparatus for determining a resource location, including:
   a first determination module, configured to determine a first resource location of a paging occasion; and
   a second determination module, configured to determine, according to the first resource location, a second resource location of a reference signal for an idle terminal.

According to an aspect of the present disclosure, there is provided a communication device, including:
   a processor; and
   a memory, configured to store an instruction executable by the processor;
   where the processor is configured to load and execute the executable instruction to implement the method for determining the resource location according to any one of the above.

According to an aspect of the present disclosure, there is provided a computer-readable storage medium, when an instruction in the computer-readable storage medium is executed by a processor, the method for determining the resource location according to any one of the above is performed.

In the embodiments of the present disclosure, the second resource location of the reference signal for the idle terminal is determined according to the first resource location of the paging occasion, and the resource location of the reference signal can be accurately determined by the idle terminal without notifying the second resource location of the reference signal of the idle terminal through dedicated signaling.

Other embodiments of the present disclosure will be apparent to those skilled in the art from consideration of the specification and practice of the present disclosure here. The present disclosure is intended to cover any variations, uses, or adaptations of the present disclosure following the general principles of the present disclosure and including common general knowledge or customary technical means in the art not disclosed in this disclosure. It is intended that the specification and examples be considered as only, with a true scope and spirit of the disclosure being indicated by the following claims.

It should be understood that the present disclosure is not limited to the exact construction that has been described above and illustrated in the accompanying drawings, and that various modifications and changes may be made without departing from the scope thereof. It is intended that the scope of the present disclosure be limited by the appended claims.

What is claimed is:

1. A method for determining resource locations, comprising:
    determining, by a communication device, a first resource location of a paging occasion; and
    determining, by the communication device and according to the first resource location, a second resource location of a reference signal for an idle terminal;
    wherein both the first resource location and the second resource location comprise a frequency domain location of a resource block;
    wherein determining the second resource location of the reference signal for the idle terminal comprises:
    determining a frequency domain location of a resource block for the reference signal as a combination of a first frequency domain location of a first resource block occupied by the paging occasion and a second frequency domain location of a second resource block on two sides of the first resource block.

2. The method according to claim 1, wherein both the first resource location and the second resource location comprise symbols, and
    wherein determining, according to the first resource location, the second resource location of the reference signal for the idle terminal comprises:
    determining symbols for the reference signal according to symbols occupied by the paging occasion.

3. The method according to claim 2, wherein the determining the symbols for the reference signal according to the symbols occupied by the paging occasion comprises:
    determining an end symbol in the symbols for the reference signal according to a start symbol in the symbols occupied by the paging occasion and a first offset value, wherein the symbols for the reference signal are before the symbols occupied by the paging occasion.

4. The method according to claim 3, wherein the first offset value is appointed by a protocol, or is configured by a system message.

5. The method according to claim 2, wherein the determining the symbols for the reference signal according to the symbols occupied by the paging occasion comprises:
    determining a start symbol in the symbols for the reference signal according to an end symbol in the symbols occupied by the paging occasion and a second offset value, wherein the symbols for the reference signal are after the symbols occupied by the paging occasion.

6. The method according to claim 5, wherein the second offset value is appointed by a protocol, or is configured by a system message.

7. The method according to claim 2, wherein the determining the symbols for the reference signal according to the symbols occupied by the paging occasion comprises:
    determining a symbol range to which the symbols for the reference signal belongs according to a number of continuous symbols, a number of at least one interval symbol and a starting symbol in the symbols occupied by the paging occasion, wherein the number of the continuous symbols is a number of symbols contained in the symbol range, the number of the at least one interval symbol is a number of at least one symbol between the starting symbol and the symbol range, and the symbol range is before the symbols occupied by the paging occasion.

8. The method according to claim 7, wherein the number of the continuous symbols and the number of the interval symbol are appointed by a protocol, or configured by a system message.

9. The method according to claim 2, wherein the symbols for the reference signal are configured for transmission of the reference signal at least one time.

10. The method according to claim 9, wherein a number of a transmission of the reference signal on the symbols for the reference signal is appointed by a protocol, or configured by a system message.

11. The method according to claim 1, wherein the frequency domain location of the resource block occupied by the paging occasion is a frequency domain location of a resource block occupied by a control resource set corresponding to the paging occasion.

12. The method according to claim 1, wherein the determining the frequency domain location of the resource block for the reference signal according to the frequency domain location of the resource block occupied by the paging occasion comprises:
    determining the frequency domain location of the resource block occupied by the paging occasion as the frequency domain location of the resource block for the reference signal.

13. The method according to claim 1, wherein a number of the second resource block on the two sides of the first resource block is equal, or the number of the second resource block on the two sides of the first resource block is different.

14. The method according to claim 1, wherein the frequency domain location of the resource block for the reference signal is located in a frequency band corresponding to an initial bandwidth part.

15. The method according to claim 1, wherein the reference signal is a tracking reference signal (TRS) or a channel state information reference signal (CSI-RS).

16. The method according to claim 1, wherein the first resource location is before the second resource location in time domain, and the method further comprises:

detecting the reference signal at the second resource location, wherein the reference signal is configured for indicating whether the terminal requires to monitor the paging occasion by the terminal; or transmitting the reference signal at the second resource location, wherein the reference signal is configured for indicating whether the terminal requires to monitor the paging occasion.

17. A communication device, comprising:

a processor; and a memory, storing an instruction executable by the processor, wherein the instruction is loaded and executed by the processor to implement a method for determining a resource location, comprising:

determining a first resource location of a paging occasion; and determining, according to the first resource location, a second resource location of a reference signal for an idle terminal;

wherein both the first resource location and the second resource location comprise a frequency domain location of a resource block;

wherein determining the second resource location of the reference signal for the idle terminal comprises:

determining a frequency domain location of a resource block for the reference signal as a combination of a first frequency domain location of a first resource block occupied by the paging occasion and a second frequency domain location of a second resource block on two sides of the first resource block.

18. A non-transitory computer-readable storage medium, wherein, when one or more instructions in the computer-readable storage medium are executed by at least one processor, a method for determining a resource location is performed, and the method comprises:

determining a first resource location of a paging occasion; and determining, according to the first resource location, a second resource location of a reference signal for an idle terminal;

wherein both the first resource location and the second resource location comprise a frequency domain location of a resource block;

wherein determining the second resource location of the reference signal for the idle terminal comprises:

determining a frequency domain location of a resource block for the reference signal as a combination of a first frequency domain location of a first resource block occupied by the paging occasion and a second frequency domain location of a second resource block on two sides of the first resource block.

* * * * *